UNITED STATES PATENT OFFICE.

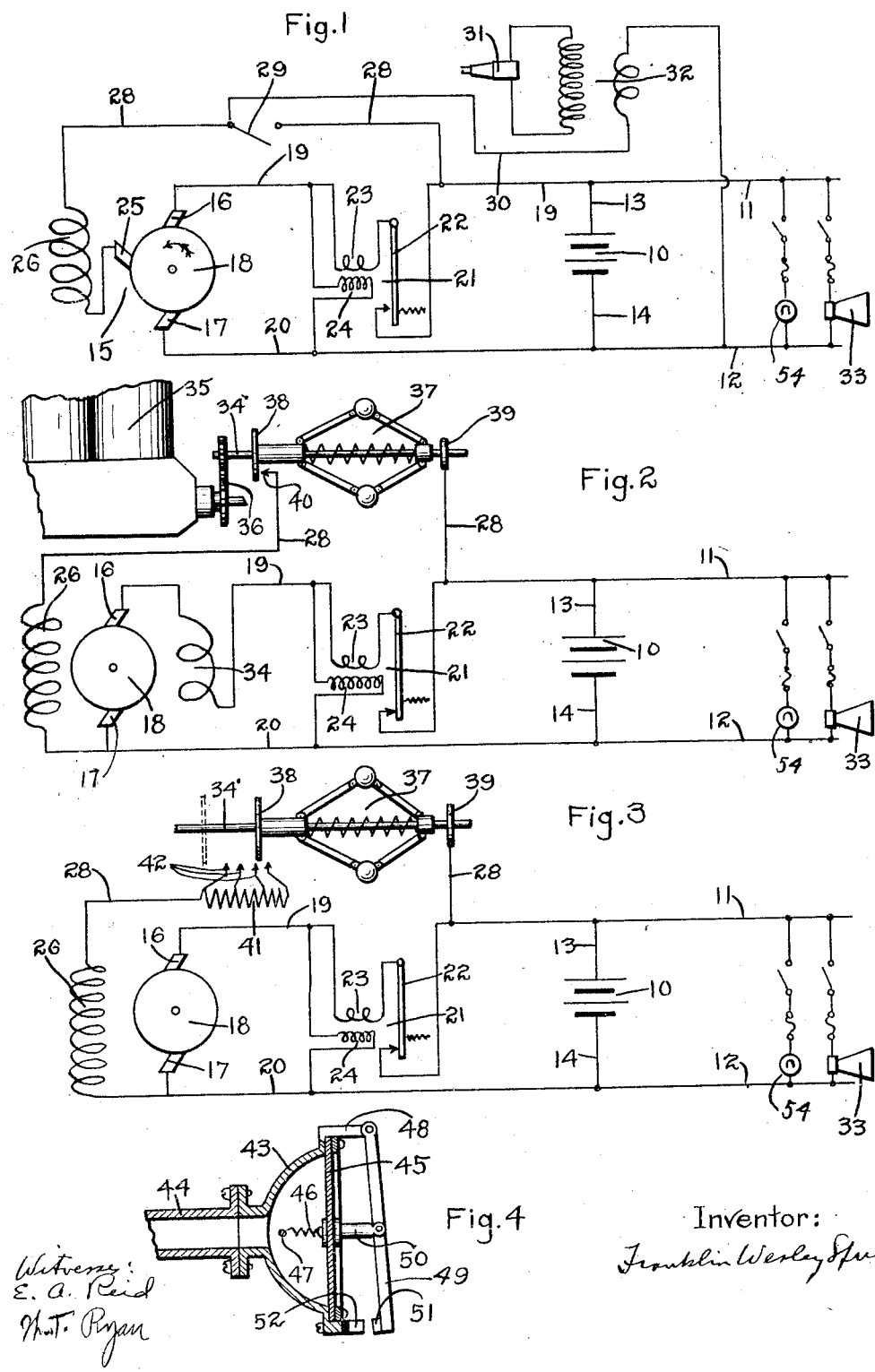

FRANKLIN WESLEY SPRINGER, OF MINNEAPOLIS, MINNESOTA.

ELECTRIC LIGHTING AND STARTING SYSTEM FOR MOTOR-VEHICLES.

1,370,162. Specification of Letters Patent. Patented Mar. 1, 1921.

Application filed November 9, 1916. Serial No. 130,390.

*To all whom it may concern:*

Be it known that I, FRANKLIN WESLEY SPRINGER, a citizen of the United States, residing at Minneapolis, in the county of Hennepin and State of Minnesota, have invented a new and useful Improvement in Electric Lighting and Starting Systems for Motor-Vehicles, of which the following is a specification.

My invention relates to electric lighting and starting systems for motor vehicles of the type in which an electric current is provided by means of a generator driven from the engine and a storage battery, both connected to a common line for the purpose of lighting or ignition or for operating a horn, engine starter, or other similar devices. It is the object of my invention to provide a system in which the field coil of the generator is separately excited from the battery upon starting the engine so as to cause the generator to positively build up and in which the same becomes excited from the generator in the usual manner after the generator commences to deliver current and which is cut out when the engine is stopped so as to prevent a discharge of the battery. In carrying out my invention, I employ a circuit for the field coil of the generator which is connected to the service line of the system to which both the generator and battery are connected. In this circuit is placed a switch which is automatically closed as the engine is started so as to impress the E. M. F. of the battery upon the field coil, and thereby provide an appreciable exciting current for causing the generator to build up, said exciting current being supplied through said circuit from the generator after the same commences to deliver current.

The full objects and advantages of my invention will appear in connection with the detailed description thereof and are particularly pointed out in the claims.

In the drawings illustrating the application of my invention, Figure 1 is a diagrammatic view of my invention in one form. Fig. 2 is a view similar to Fig. 1 of a modification of the system shown in Fig. 1. Fig. 3 is a view similar to Fig. 1 of another modification of the invention. Fig. 4 is a sectional view of another form of switch operating means.

In ordinary automobile practice an electric power system is employed which is clearly shown in Fig. 1 with my invention applied thereto. A storage battery 10 which need only be a four-volt battery if desired, is connected across a service line 11, 12 by means of leads 13 and 14. A generator 15, which is preferably automatically regulated to deliver a suitably constant current (or constant voltage) is also connected to the service line 11, 12. A third brush or auxiliary brush machine of well-known construction in Fig. 1, has the principal brushes 16 and 17 of its armature 18 connected to said service line by means of leads 19 and 20. An automatic switch 21 of common type has an armature 22 and a current coil 23 connected in series in lead 19, and also has a potential coil 24 connected across leads 19 and 20. This device is adapted to break the circuit through leads 19 and 20 from battery 10 when armature 18 ceases to deliver current, coils 23 and 24 acting differentially upon reversal of the current through lead 19 to release armature 22 and break the circuit. The intermediate brush or auxiliary brush 25 of generator 15 is connected to one terminal of a field coil 26. The armature of generator 18 is usually permanently driven by the engine of the vehicle and hence rotates with it at all times. When this system is employed the building up of the field is very uncertain due to the fact that the generator delivers current at a very low voltage and that the greatest resistance drop of the same lies in the brush contacts so that any irregularity of contact is quite apt to prevent flow of current through the field coil and so prevent the building up of the field. This applies particularly when the generator 15 is adjusted to deliver small charging currents.

My invention overcomes the difficulty of failure to build up, as follows: One terminal of field coil 26 is connected to brush 25 as is customary and the other end is connected to a lead 28 which in turn is connected to the line wire 11 at a point between the no load release switch 21 and the battery 10. Lead 28 is connected to a switch 29, which may be operated in several different ways to complete the circuit from the battery 10 through field coil 26 when the engine is started. In Fig. 1 switch 29 is shown to be the manually operated ignition switch which is inserted in a line 30 adapted to send current from the service line 11, 12 through a spark plug 31 by means of a spark coil 32. In order to start the engine it is necessary to close switch 29. In so doing a complete circuit is established from battery 10 through field coil 26 and the same becomes separately excited. When the engine picks up speed generator 15 commences to deliver current and switch 21 is closed which causes the battery 10 to be charged. This system may be used to operate a number of lights such as indicated at 54 or a horn 33 or other electrical devices. It hence becomes evident that when the engine runs at normal speed the generator supplies current for the excitation of the field coil 26 as well as for the operation of spark plug 31. In this manner positive building up of the field of the generator is effected.

My invention may also be employed with a compound wound generator, as is shown clearly in Fig. 2. In the system therein shown, the shunt field coil 26 is connected to brush 17 and an additional field coil 34 is provided which is connected in lead 19 in series with the armature 18. Instead of the switch 29 shown in Fig. 1 for closing the circuit through line 28, I have shown a modification which may be equally well employed. A shaft 34' is driven from the engine 35 by means of gearing 36. Upon shaft 34' is mounted a centrifugal governor 37 of ordinary construction, as well as a slidable disk 38 operated thereby. This device is connected in the circuit 28 by means of a ring 39 and by means of a fixed contact 40, which is engaged by disk 38 when shaft 34' rotates at a suitable speed. In this manner the circuit 28 from battery 10 through field coil 26 is maintained closed while the engine is operating, thus causing the system to operate as heretofore specified.

In Fig. 3 is shown a shunt wound generator with a field having a variable resistance. In line 28 is inserted a resistance coil 41 provided with a number of tap leads connected to suitable contacts 42 which may be successively engaged by disk 38 to cut in a greater amount of resistance as the engine gains in speed to maintain a constant voltage. When the engine is at rest disk 38 takes the position shown in dotted lines, thereby breaking the circuit through lead 28.

Any number of devices may be used for closing the circuit through lead 28 when the engine is started. Another form of this portion of the invention is shown in Fig. 4. A cup-shaped member 43 is secured to a tube 44 which may be attached to the intake manifold of the engine or which may be inserted in front of the cooling fan, so that a partial vacuum may be formed therein when the engine is in operation. A flexible diaphragm 45 is secured to the face of member 43 and is normally held outward by means of a compression coil spring 46 secured thereto which acts against a pin 47 secured to member 43. On an ear 48 formed on the face of member 43 is pivoted a bar 49 which extends completely across said member. A piece 50 is pivoted at one end to the center of bar 49 and is attached at the other end to diaphragm 45. The free end of bar 49 is formed with a switch contact 51 which is adapted to engage a corresponding contact member 52 insulated from and secured to case member 43. When the engine is set in operation a partial vacuum is created within member 43 and the diaphragm 45 drawn inward, the piece 50 drawing the bar 49 inward and bringing the member 51 in contact with member 52. Lead 28 is connected to member 52 and the body of case 43 so that as the diaphragm 45 is operated said switch is closed, circuit is completed and the system operated.

The advantages of my invention are manifest. The system is fool-proof so that the excitation circuit can not be left connected to the battery when the engine is stopped to cause a discharge of the battery. A low voltage battery may be employed due to the fact that the field is separately excited upon starting, since the building up of the field is not then dependent upon the extremely low voltage generated before the generator comes up to voltage as in ordinary generators.

I claim:

1. In combination with the ignition system of a motor vehicle, a generator having an armature and a field coil, a battery, a line connecting said battery with said armature, a circuit connecting the field coil and ignition system with one side of the line, a circuit connected with said last named circuit at a point intermediate the ignition system and field coil and with the opposite side of the line, a switch in said last named circuit, a circuit connecting said armature with said line, an automatic switch in said armature circuit, a normally open circuit connecting said field coil with one side of said armature and with the opposite side of said armature circuit at a point between said automatic switch and said battery.

2. An electric system for motor vehicles comprising a third brush generator having a field coil, a battery, a circuit connecting the field coil with the third brush and the battery so that the field coil receives at starting from the battery, through a portion of the armature winding of said generator, a separately exciting current in excess of its normal running excitation current, and a switch in the circuit.

3. An electric system for motor vehicles comprising a battery, a third brush generator having a field coil and armature, a line connecting said armature and battery in parallel, a field circuit connecting said field coil with the third brush and one side of said line so that the field coil receives a separate exciting current at starting from the battery through a portion of the armature winding of said generator and a switch in said last named circuit.

4. In combination with the ignition system of a motor vehicle an electrical system comprising a third brush generator having an armature and field coil, a battery, a line connecting said battery with said armature, a circuit connecting the field coil and ignition system with the third brush and one side of the line, a circuit connected with said last named circuit at a point intermediate the ignition system and field coil and with the opposite side of the line, and a switch in said last named circuit.

5. In combination with the engine of a motor vehicle, an electrical system comprising a line, a battery connected therewith, a third brush generator having a field coil and an armature, a circuit connecting said armature with the line, an automatic switch inserted in said armature circuit and adapted to be closed by current from the said generator, a normally open circuit connecting said field coil with the third brush and with one side of said armature circuit at a point between said automatic switch and said battery and means associated with said engine for closing said field coil when the engine is started.

6. In an electrical system, the combination with a variable speed generator having main and auxiliary brushes, a field coil adapted to be energized from said brushes, a battery connected with said generator and adapted to be charged thereby and means for connecting said battery with said field coil through a portion of the armature winding of said generator for separate excitation of the generator.

7. In an electrical system, the combination with a variable speed generator having main and auxiliary brushes, a field coil connected to the auxiliary brush, a battery connected to said main brushes and adapted to be charged from said generator, and means for connecting said battery with said field coil through a portion of the armature winding of said generator for separate excitation of the generator.

8. In an electrical system, the combination with a variable speed generator having main and auxiliary brushes, a field coil connected to the auxiliary brush, a battery connected to said main brushes and adapted to be charged from said generator, an automatic switch for breaking the circuit between said battery and said main brushes when the generator is inoperative, and means for connecting said battery ahead of said switch to said field coil through a portion of the armature winding of said generator for separate excitation of the generator.

9. In an electrical system, the combination with a variable speed generator having main and auxiliary brushes, a field coil connected to the auxiliary brush, a battery connected to said main brushes and adapted to be charged from said generator, an automatic switch for breaking the circuit between said battery and said main brushes when the generator is inoperative, means for connecting said battery ahead of said switch to said field coil through a portion of the armature winding of said generator for separate excitation of the generator, and a switch for breaking the circuit between said battery and said field coil.

10. The combination of an engine, a variable speed generator having main and auxiliary brushes, a battery connected to said main brushes and adapted to be charged from said generator, a field coil connected to said auxiliary brush, an ignition system for said engine operated from said battery, a circuit connecting said ignition system and said field coil with said battery, and means for connecting said battery with said field coil through a portion of the armature winding of said generator for separate excitation of the generator.

11. The combination of an engine, a generator having main and auxiliary brushes, a battery connected to said main brushes and adapted to be charged from said generator, a field coil connected to said auxiliary brush, an ignition system for said engine operated from said battery, a circuit connecting said ignition system and said field coil with said battery, a switch for simultaneously closing said circuit and rendering said ignition operative upon starting the engine and for simultaneously opening said circuit and rendering said ignition system inoperative upon stopping the engine, and means for connecting said battery with said field coil through a portion of the armature winding of said generator for separate excitation of the generator.

FRANKLIN WESLEY SPRINGER.

Witnesses:
W. T. RYAN,
E. R. MARTIN.